United States Patent
Triki et al.

(10) Patent No.: US 9,008,327 B2
(45) Date of Patent: Apr. 14, 2015

(54) ACOUSTIC MULTI-CHANNEL CANCELLATION

(75) Inventors: Mahdi Triki, Eindhoven (NL); Cornelis Pieter Janse, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 738 days.

(21) Appl. No.: 13/321,995

(22) PCT Filed: May 27, 2010

(86) PCT No.: PCT/IB2010/052352
§ 371 (c)(1),
(2), (4) Date: Nov. 22, 2011

(87) PCT Pub. No.: WO2010/140084
PCT Pub. Date: Dec. 9, 2010

(65) Prior Publication Data
US 2012/0063609 A1    Mar. 15, 2012

(30) Foreign Application Priority Data
Jun. 2, 2009   (EP) ..................... 09161675

(51) Int. Cl.
*G10K 11/16*   (2006.01)
*H04B 15/00*   (2006.01)
*H04M 9/08*    (2006.01)
*H04R 3/02*    (2006.01)

(52) U.S. Cl.
CPC   *H04M 9/082* (2013.01); *H04R 3/02* (2013.01)

(58) Field of Classification Search
CPC ............ H04M 9/082; H04R 3/02; H04B 3/20
USPC ......... 381/66, 71.1, 94.1; 379/406.05, 406.09
See application file for complete search history.

(56) References Cited

U.S. PATENT DOCUMENTS

| | | | |
|---|---|---|---|
| 5,761,318 A * | 6/1998 | Shimauchi et al. | 381/66 |
| 6,785,391 B1 * | 8/2004 | Emura et al. | 381/61 |
| 7,043,013 B2 | 5/2006 | Le Tourneur et al. | |

(Continued)

OTHER PUBLICATIONS

Tangsangiumvisai et al: "Time-Varying Filters Using Spectral-Shaped Noise for Signal Decorrelation in Stereophonic Acoustic Echo Cancellation"; APCCAS'02, IEEE Asia-Pacific Conference on Circuits and Systems, 2002, vol. 1, pp. 87-92.

(Continued)

*Primary Examiner* — Fan Tsang
*Assistant Examiner* — Eugene Zhao

(57) ABSTRACT

A multi-channel acoustic echo canceller arrangement comprises a microphone (111) providing a microphone signal having contributions from at least two audio sources (107, 109) to be cancelled. An echo canceling circuit (113, 115) performs echo cancellation of the two audio sources (107, 109) based on channel estimates for channels from each of the audio sources (107, 109) to the microphone (111). An estimation circuit (117) generates each of the channel estimates as a combination of a previous channel estimate and a channel estimate update where the combination includes applying a relative weight to the channel estimate update relative to the previous channel estimate. A weight processor 119 varies the relative weight in response to a time value. The arrangement may provide improved echo-cancellation for scenarios wherein the rendering of sound from the audio sources (107, 109) is time varying, such as when time varying decorrelation filters are used.

14 Claims, 2 Drawing Sheets

(56) References Cited

U.S. PATENT DOCUMENTS

| | | | |
|---|---|---|---|
| 7,310,425 B1 | 12/2007 | Benesty et al. | |
| 7,333,605 B1 | 2/2008 | Zhang et al. | |
| 7,627,111 B2 * | 12/2009 | Bershad et al. | 379/406.02 |
| 2004/0100916 A1 * | 5/2004 | Bershad et al. | 370/286 |

OTHER PUBLICATIONS

M. Ali: "Sterphonic Acoustic Echo Cancellation System Using Time-Varying All-Pass Filtering for Signal Decorrelation"; IEEE International Conference on Acoustics, Speech and Signal Processing, May 1998, vol. 6, pp. 3689-3692.

J. Valin: :Perceptually-Motivated Nonlinear Channel Decolleration for Stereo Acoustic Echo Cancellation; Hands-Free Speech Communication and Microphone Arrays, HSCMA 2008, May 2008, pp. 188-191.

Khong et al: "A Low Complexity Fast Converging Partial Update Adaptive Algorithm Employing Variable Step-Siz for Acoustic Echo Cancellation"; ICASSP, IEEE 2008, pp. 237-240.

Tingchan et al: "Performance of a Robust Variable Step-Size LMS Adaptive Algorithm for Multiple Echo Cancellation in Telephone Network"; SICE-ICASE International Joint Conference, 2006, IEEE, pp. 3173-3176.

* cited by examiner

ACOUSTIC MULTI-CHANNEL CANCELLATION

FIELD OF THE INVENTION

The invention relates to acoustic echo cancellation and in particular, but not exclusively, to acoustic echo cancellation for remote communication applications.

BACKGROUND OF THE INVENTION

Acoustic echo cancellers (AECs) are used in communication systems, such as teleconferencing systems, to reduce the echo that results from the coupling between the loudspeaker(s) and microphone(s) at one end of a two way communication. For example, in many teleconferencing systems, the loudspeakers presenting the signal received from a far end are located close to the microphone for capturing sound at the local end. Accordingly, the sound produced by the loudspeakers is also picked up by the microphone and may therefore be returned to the far end resulting in a discernable echo at the far end. AECs are used to attenuate and preferable remove any contribution from the loudspeakers in the signal from the microphone.

AECs are often provided with the signals for the loudspeakers and then seek to estimate the resulting signal captured by the microphone. This predicted signal is then subtracted from the microphone signal. Typically, a single-channel (monophonic) system seeks to estimate the acoustic path response for the acoustic path from the loudspeaker to the microphone and use this estimation to generate the predicted signal. Thus, such an AEC simultaneously reduces the echo and identifies the acoustic path thereby ensuring that the echo remains cancelled no matter what happens at the remote end.

Multi-channel (e.g. stereo) teleconferencing systems have further been proposed where spatial information is captured at the remote end e.g. using two or more microphones. Such a system tends to provide a more realistic presence perception than a monophonic system since listeners can use the additional spatial information to facilitate e.g. audio scene analysis which is the process by which the brains reduces a sample of simultaneous audio streams into individual constituent sounds. Spatial information tends to result in increased intelligibility of speech signals in noisy surroundings and during double talk. It has also been found to reduce listener fatigue.

One of the main challenges in multi-channel echo cancellation is the strong coherence that exists between the input signals, making it hard or even impossible to correctly estimate the acoustic paths. For example, if the captured sound at the far end predominantly originates from a single speaker located equidistantly from the two microphones, the two resulting signals received at the near end may be virtually identical. Therefore, the individual contribution from each loudspeaker which is being captured by the microphone cannot easily be separated and therefore the individual acoustic path response of the acoustic path from each of the loudspeakers cannot be accurately estimated. In other words, it is not feasible to identify the individual contribution from the two loudspeakers.

To improve the performance of a multi-channel echo canceller, it has been proposed to reduce the coherence between the received signals by applying different time-varying all-pass filters for the different channels. Thus, it has been proposed that each received signal from the far end is first filtered by a time-varying filter with the different filters varying differently. This introduces a decorralation of the signals radiated by each loudspeaker thereby allowing the individual acoustic paths to be estimated Several approaches have been proposed to define and update the time-varying filters $g_1(q) \ldots g_M(q)$ such as e.g. using an allpass filter with changing characteristics. The filters are selected to provide an effective input decorrelation for an acceptable audio degradation as a result of introduced audio artifacts. Specific examples are described in the articles M. Ali, "Stereophonic Acoustic Echo Cancellation System Using Time-Varying All-Pass Filtering for Signal Decorrelation," In Proc. of IEEE Int. Conf. on Acoustics, Speech, and Signal Processing (ICASSP), Vol. 6, pp. 3689-3692, May 1998; N. Tangsangiumvisai, J. A. Chambers and A. G. Constantinides, "Time-Varying Allpass Filters Using Spectral-Shaped Noise for Signal Decorrelation in Stereophonic Acoustic Echo Cancellation," In Proc. of IEEE Asia Pacific Conf. on Circuits & Systems (APCCAS), Vol. 1, pp. 87-92, October 2002; and J. M. Valin, "Perceptually-Motivated Nonlinear Channel Decorrelation For Stereo Acoustic Echo Cancellation," In Proc. of Joint Workshop on Hands-free Speech Communication and Microphone Arrays (HSCMA, May 2008.

However, although such decorrelation has been found to improve the channel estimation accuracy, the echo cancellation has been found to be suboptimal in many scenarios.

Hence, an improved acoustic echo cancellation approach would be advantageous and in particular an approach allowing increased flexibility, increased cancellation, facilitated implementation and/or improved performance would be advantageous.

SUMMARY OF THE INVENTION

Accordingly, the Invention seeks to preferably mitigate, alleviate or eliminate one or more of the above mentioned disadvantages singly or in any combination.

According to an aspect of the invention there is provided a multi-channel acoustic echo canceller arrangement comprising: a circuit for receiving a microphone signal from a microphone, the microphone signal comprising contributions from at least two audio sources to be cancelled; an echo canceling circuit coupled to the microphone, the echo canceling circuit being arranged to perform echo cancellation of the two audio sources based on channel estimates for channels from each of the audio sources to the microphone; an estimation circuit for generating each of the channel estimates as a combination of a previous channel estimate and a channel estimate update, the combination comprising applying a relative weight to the channel estimate update relative to the previous channel estimate; and a weight circuit arranged to vary the relative weight in response to a time value.

The invention may provide improved echo cancellation in many embodiments. In particular, in many scenarios the approach may be particularly well adapted to canceling a plurality of sound sources based on acoustic path channel estimates for the individual paths. The approach may allow a low complexity and/or facilitated implementation. A facilitated operation may often be achieved and in particular the approach may typically be implemented with a low computational resource requirement.

The variation may be dependent on the time value by the relative weight being determined as a function of the time value. The function may further be dependent on other parameters. However, the dependency on the time value may be such that the relative weight will vary even if all other parameter values are constant.

In accordance with an optional feature of the invention, the multi-channel acoustic echo canceller arrangement further comprises a time varying filter for each of the two audio sources, each time varying filter being arranged to filter a signal for one of the two audio sources.

This may provide improved echo cancellation of a plurality of audio sources in many scenarios. In particular, it may provide improved channel estimation. The use of time varying filters to introduce decorrelation between the audio sources together with the time dependent weighting of updates for the channel estimates in particular combine to provide a substantial improvement in many scenarios.

In accordance with an optional feature of the invention, the time value is a time duration since a last update of at least one of the time varying filters.

This may provide particularly advantageous performance. An improved echo cancellation may often be achieved. The weighting of the channel estimate update for an audio source may be determined as a function of the time since the last time the time varying filter was changed for this audio source.

In accordance with an optional feature of the invention, the weight circuit is arranged to increase the relative weight of the channel estimate update for increasing time durations.

This may provide improved performance. The relative weight may specifically be a monotonically increasing (or non-decreasing) function of the time duration since the last change of the time varying filter. Indeed, the relative weight may be determined by a function meeting the requirement $f(a) \leq f(b)$ for all $a < b$. The relative weight for the channel estimate update may specifically be a step function which is monotonically non-decreasing.

In accordance with an optional feature of the invention, the weight circuit is arranged to generate a scaling factor for a nominal weight value and to determine the relative weight in response to the scaling factor for the nominal weight value, the scaling factor being dependent on the time duration.

This may allow efficient and low complexity echo cancellation in many scenarios. The relative weight for the channel estimate update may specifically be determined as the nominal weight value multiplied by the scaling factor. The nominal weight value may be a fixed value and may specifically be non-time dependent (although it may in such cases depend on other parameters).

In accordance with an optional feature of the invention, at least one time-varying filter is arranged to be updated at discrete times thereby providing filter frames in which the time varying filter is constant; and the weight circuit is arranged to vary the relative weight within a filter frame dependent on a current time duration since a start of the filter frame.

This may provide improved performance and/or may allow facilitated operation and/or implementation. The relative weight may exhibit the same pattern for each filter frame. In particular, for constant duration filter frames (corresponding to a periodic filter update), the relative weight may exhibit a repeating pattern with a period correspond to the filter frame duration.

In accordance with an optional feature of the invention, the echo-canceling circuit is arranged to perform frame based echo-canceling; and the weight circuit is arranged to vary the relative weight between consecutive echo-cancellation frames.

This may provide improved performance and/or may allow facilitated operation and/or implementation. The relative weight may be constant within each echo-cancellation frame.

In accordance with an optional feature of the invention, the weight circuit is arranged to determine the relative weight as a function of an echo-cancellation frame number within a filter frame.

This may allow low complexity operation and implementation while providing an efficient echo cancellation. The relative weight may specifically be determined by scaling a nominal weight by a scaling factor corresponding to a current frame number divided by a total number of echo cancellation frames in a filter frame.

In accordance with an optional feature of the invention, the weight circuit is arranged to determine a weight value for the channel estimate update as substantially proportional to:

$$\frac{k \bmod K}{K}$$

where k is the echo cancellation frame number, K is a number of echo cancellation frames in a filter frame and mod represents the modulo function.

This may allow low complexity operation and implementation while providing an efficient echo cancellation.

In accordance with an optional feature of the invention, there is a substantially integer relationship between a duration of the filter frames and a duration of the echo-cancellation frames.

This may allow low complexity operation and implementation while providing an efficient echo cancellation.

In accordance with an optional feature of the invention, the multi-channel acoustic echo canceller arrangement further comprises a change circuit for detecting that a change in at least a first channel of the channels from each of the audio sources to the microphone meets a criterion; and a circuit for determining the time value as a time duration from the change.

This may provide improved echo cancellation in many embodiments and may in particular provide improved adaptation of a multi-channel echo cancellation to changes in the acoustic paths, e.g. arising from movement of the microphone or an audio source.

In accordance with an optional feature of the invention, the change circuit is arranged to set an initial value for the relative weight following the change; and the weight circuit is arranged to increase the relative weight for increasing time durations since the change.

This may provide improved and/or facilitated operation in many embodiments. The weight circuit may specifically be arranged to increase the relative weight until it reaches a maximum value.

In accordance with an optional feature of the invention, the weight circuit is arranged to determine the relative weight as a function of an echo-canceling averaging interval.

This may provide improved and/or facilitated operation in many embodiments.

In accordance with an optional feature of the invention, the relative weight is a function only of a nominal weight value and the time value.

This may allow low complexity operation and implementation while providing an efficient echo cancellation. The relative weight for the channel estimate update may specifically be determined as the nominal weight value multiplied by the scaling factor. The nominal weight value may be a fixed value and may specifically be non-time dependent (although it may in such cases depend on other parameters).

According to an aspect of the invention there is provided a method of multi-channel acoustic echo cancellation using an echo canceling circuit coupled to a microphone, the method comprising: receiving a microphone signal from the microphone, the microphone signal comprising contributions from at least two audio sources to be cancelled; performing echo cancellation of the two audio sources based on channel estimates for channels from each of the two audio sources to the microphone; generating each of the channel estimates as a combination of a previous channel estimate and a channel estimate update, the combination comprising applying a relative weight to the channel estimate update relative to the previous channel estimate; and varying the relative weight in response to a time value.

These and other aspects, features and advantages of the invention will be apparent from and elucidated with reference to the embodiment(s) described hereinafter.

BRIEF DESCRIPTION OF THE DRAWINGS

Embodiments of the invention will be described, by way of example only, with reference to the drawings, in which.

DETAILED DESCRIPTION OF SOME EMBODIMENTS OF THE INVENTION

The following description focuses on embodiments of the invention applicable to a multi-channel echo canceller arrangement for a teleconferencing system. However, it will be appreciated that the invention is not limited to this application but may be applied to many other applications.

Figure 1:
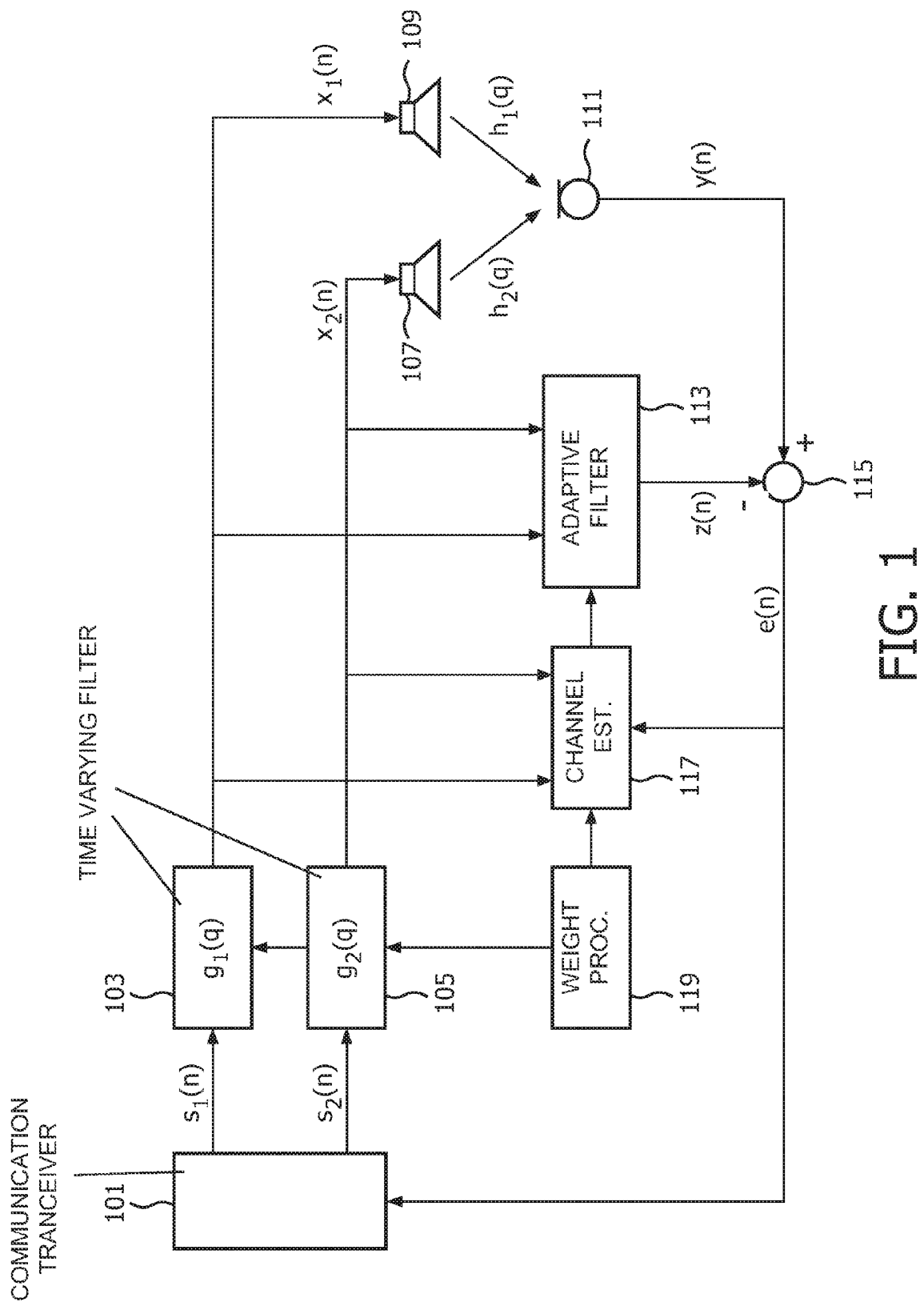
FIG. 1 illustrates an example of a conferencing unit for a tele-conference system comprising a multi-channel echo canceller in accordance with some embodiments of the invention.

FIG. 1 illustrates an example of a conferencing unit for a teleconferencing system comprising a multi-channel echo canceller arrangement in accordance with some embodiments of the invention. The conferencing unit comprises a communication transceiver 101 which is arranged to communicate with at least one remote conferencing unit. Depending on the specific embodiment, the communication transceiver 101 may e.g. comprise functionality for communicating with the far end conferencing unit via e.g. a traditional phone network, a cellular communication system, the Internet or any other suitable communication means.

In the example, the far end conferencing unit is a multi-channel teleconferencing unit that provides a plurality of signals. Thus, the far end conferencing unit comprises a plurality of microphones, each of which results in a signal being communicated to the near end conferencing unit of FIG. 1. The following description will for brevity and clarity focus on a stereo conferencing system wherein the far end comprises two microphones and provides two signals to the near end conferencing unit. However, it will be appreciated that the described approaches and principles can readily be applied to systems with more channels.

The communication transceiver 101 is arranged to receive the two signals $s_1(n)$ and $s_2(n)$ from the far end conferencing unit. In the example, the communication transceiver 101 is coupled to a first and second time varying filter 103, 105, each of which is arranged to filter one of the received signals $s_1(n)$, $s_2(n)$ to generate the filtered signals $x_1(n)$ and $x_2(n)$. Each of the time varying filters 103, 105 is coupled to a loudspeaker 107, 109 which radiates the corresponding sound into the audio environment. It will be appreciated that the described signal paths will typically comprise other suitable signal processing functionality such as a power amplifier for the loudspeakers 107, 109. However, for clarity and brevity such functionality is not explicitly illustrated in FIG. 1 and may be considered to be part of the loudspeaker units 107, 109 and/or the time varying filters 103, 105.

The conferencing unit furthermore comprises a microphone 111 which captures the audio in the audio environment. The microphone specifically captures the sound to be transmitted to the far end conferencing unit (e.g. the sound from a local speaker). However, due to the loudspeakers 107, 109 being located in the same audio environment, the microphone 111 will also pick up sound radiated from the two audio sources corresponding to the two loudspeakers 107, 109. If the captured signal is directly sent to the far end conferencing unit this will result in an echo and therefore the conferencing unit comprises a multi-channel echo canceller arrangement that seeks to attenuate the signal component from the loudspeakers 107, 109 as much as possible.

Specifically, the system includes an echo canceling circuit which comprises an adaptive filter 113 and a subtraction unit 115. The adaptive filter 113 receives the signals $x_1(n)$, $x_2(n)$ fed to the loudspeakers 107, 109 and filters these to generate an estimate $z(n)$ of the signal component of the microphone signal $y(n)$ which originates from the loudspeakers 107, 109. The subtractor unit 115 receives the microphone signal $y(n)$ and subtracts the estimated signal $z(n)$ to generate the resulting echo cancelled signal $e(n)$. Ideally, the echo canceling completely cancels the contribution from the loudspeakers 107, 109 such that $e(n)$ includes only the contribution from the locally generated sources.

The resulting signal $e(n)$ is then fed to the communication transceiver 101 which transmits it to the far end conferring unit. It will be appreciated that the described signal path for the microphone 111 will typically comprise other suitable signal processing functionality such as a low noise audio amplifier for the microphone or filters for the echo cancelled signal $e(n)$. However, for clarity and brevity such functionality is not explicitly illustrated in FIG. 1 and may be considered to be part of the microphone 111 and/or the communication transceiver 101.

The estimated signal $e(n)$ is based on estimates of the channel responses $h_1(n)$, $h_2(n)$ for the paths from the loudspeakers 107, 109 to the microphone 111. These estimates may include the responses of any functionality being part of the microphone 111 and the loudspeaker units 107, 109. However, typically the channel estimates are dominated by the characteristics of the acoustic paths. The conferencing unit of FIG. 1 includes a channel estimator 117 which is arranged to generate a channel estimate for each of the channels from one of the loudspeakers 107, 109 to the microphone 111.

The adaptive filter may then filter the first loudspeaker signal $x_1(n)$ by the first estimate $h_1(n)$ and the second loudspeaker signal $x_2(n)$ by the second estimate $h_2(n)$. The resulting filtered signals are added together to provide an estimate $z(n)$ of the channel from the loudspeakers 107, 109 to the microphone 111.

In order to provide an effective echo cancellation, the determination of the channel estimates is thus important. In a conventional single channel echo cancellation, the channel estimate is often calculated by generating a current channel estimate (e.g. for a current frame) and using this to modify an existing channel estimate (determined e.g. based on previous frames). The weighting for the update relative to the existing estimate may be set to provide a desired trade-off between speed of adaptation, stability and noise.

In the example where more than one audio source (loudspeaker 107, 109) are cancelled, the channel estimation may be performed by for each individual channel estimate determining a current channel estimate update and using this to update an existing channel estimate. Thus, the approach for a single channel may be extended to a plurality of channels. In the system of FIG. 1, the channel estimator 117 thus generates a first and second channel estimate for the first and second speaker 107, 109 respectively. The estimates are generated by combining a previous channel estimate for the channel and a channel estimate update.

However, the inventors have furthermore realized that such an approach in itself tends to be insufficient to provide optimal performance in a scenario wherein multiple audio sources are cancelled and time varying characteristics (such as those arising from the time varying filters) are significant. Indeed, the inventors have realized that the relative weight between the channel estimate update and the previous channel estimate should be dependent on time and specifically should vary with time even if all other parameters are constant.

This realization is based on a detailed analysis which will be presented in the following. In the analysis a notation is used wherein upper- and lower-case boldface letters denote matrices and vectors, respectively. Upper- and lower-case normal letters represent scalar constants and processes, respectively. Either as a subscript, superscript or argument, n and k refer to time and frame indexes respectively.

The signals $s_1(n)$ and $s_2(n)$ received from the far end are assumed to be stationary correlated signals (typically, they originate from the same source). To reduce the input signal coherence, these signals pass through the different time-varying filters 103, 105 with respective transfer functions $g_1^{(k)}(q)$ and $g_2^{(k)}(q)$.

Specifically, the time varying filters 103, 105 are designed as allpass filters, such as a Finite Impulse Response (FIR) filters:

$$g_i^{(k)}(q) = \Sigma_\tau g_\tau^{(k)} q^{-\tau}, i=1,2$$

The filters vary in a piece-wise constant manner, i.e., they are constant within a given time frame henceforth referred to as a filter frame. In the example, each filter frame has the same duration/length $T_G$.

The decorrelated signals $x_1(n)$ and $x_2(n)$ are altered by the room channel impulse responses represented by the FIR impulse responses $$h_i(q) = \Sigma_\tau h_{i,\tau} q^{-\tau}, i=1,2$$

The resulting signals are captured by the microphone 111 together with the desired signal (e.g. a local speaker) and typically some additive noise. The multi-channel echo canceling circuit 113, 115 seeks to remove the contribution from the loudspeakers 107, 109 in the captured signal y(n).

This is specifically performed by filtering the decorrelated signals $x_1(n)$ and $x_2(n)$ in the adaptive filter 113 based on the channel estimates (the channel impulse responses). The captured signal y(n) is then compensated for the undesired component z(n). Specifically:

$$e(n) = y(n) - (\hat{h}_1 * x_1)(n) - (\hat{h}_2 * x_2)(n)$$

where (•*•) denotes the convolution operator.

Using matrix notations, the echo cancellation can be formulated as:

$$e(n) = y(n) - \underbrace{[x_1^T(n) x_2^T(n)]}_{x^T(n)} \underbrace{\begin{bmatrix} \hat{h}_1 \\ \hat{h}_2 \end{bmatrix}}_{\hat{h}}$$

where: $\hat{h}_i = [\hat{h}_{i,0} \, \hat{h}_{i,1} \, \ldots \, \hat{h}_{i,L-1}]^T$ contains the estimate of the channel impulse response between the $i^{th}$ loudspeaker 107, 109 and the microphone 111, $x_i(n) = [x_i(n) x_i(n-1) \ldots x_i(n-L+1)]^T$ represents the loudspeaker output. L is the assumed channel impulse response length (or a given upper bound); and $(\bullet)^T$ denotes the transpose operator.

It can be shown that since the noise and the desired signals are independent of the signals from the loudspeakers 107, 109, the echo can be effectively cancelled by minimizing the power of the residual signal e(n). The minimization is typically implemented in an adaptive fashion, using for instance an RLS (Recursive Least-Squares) scheme or e.g. frequency domain efficient implementations, such as the Multiple Input Frequency Domain Adaptive Filter (MFDAF) algorithm.

Figure 2:
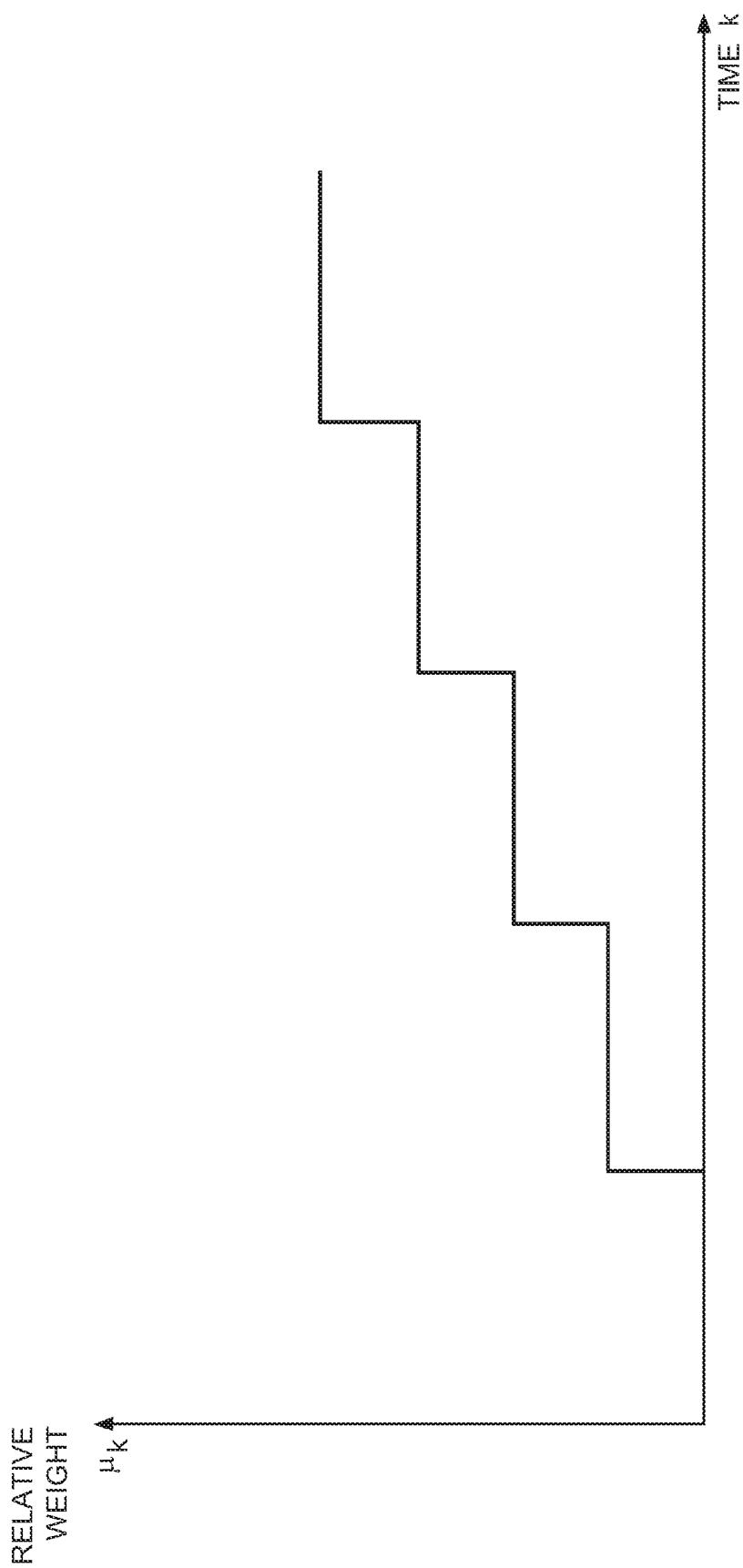
FIG. 2 illustrates an example of a time varying relative weight for a channel estimate update.

For computational efficiency, a frame-per-frame analysis is often used. In such approaches, the input signal is first segmented into frames and the channel estimate is updated on a frame-by-frame bases. In the example of FIG. 2, the echo cancellation is performed on a frame basis with the channel estimates being updated between consecutive echo cancellation frames but being maintained constant within each frame.

In a conventional single channel echo cancellation process, the channel estimate may be updated for each new frame by calculating a channel estimate update and modifying the previous channel estimate based on the updated.

Specifically, the channel estimate for frame k may be calculated as:

$$\hat{h}_i^k = \hat{h}_i^{k-1} + \mu \cdot \Delta \hat{h}_i^k$$

where $\Delta \hat{h}_i^k$ is the channel estimate update for frame k and μ is an update weight indicative of the step size for the channel estimate updating. Specifically, for an RLS update, the following may be used:

$$\Delta \hat{h}_i^k = R_x^{-1} \sum_{n=(k-1) \cdot T_H+1}^{k \cdot T_H} x_i(n) * e(n)$$

where $T_H \geq L$ denotes the duration of the echo canceling frame, and $R_x$ is the autocorrelation of x computed as:

$$R_x = \frac{1}{MT_H} \sum_{n=(k-1) \cdot T_H+1}^{(k+M-1) \cdot T_H} x(n) x^T(n) =$$

$$\frac{1}{MT_H} \sum_{n=(k-1) \cdot T_H+1}^{(k+M-1) \cdot T_H} \begin{bmatrix} x_1(n) \\ x_2(n) \end{bmatrix} [x_1^T(n) \, x_2^T(n)]$$

where $M \cdot T_H$ represents the (averaging) memory of the adaptive filter.

Thus, in this example, the update of a channel estimate is basically dependent on the correlation of the signal fed to the corresponding loudspeaker 107, 109 and the echo cancelled signal e(n) (and compensated for the input signal autocorrelation). In essence, the approach seeks to identify the residual component that has not been cancelled by the echo cancellation and to update the channel estimate such that the updated channel estimate would have resulted in full cancellation.

Most conventional multi-channel echo cancellers focus on minimizing the difference between the individual channel estimates and the individual paths from the loudspeakers to the microphone. However, the Inventors have realized that this does not necessarily result in optimum performance for multi-channel echo cancellers, and that indeed improved echo canceling may often be achieved in practice by focusing on the optimization of the combined echo cancellation of the multiple sources rather than merely focusing on convergence of the individual channel estimates. For example, improved performance may be achieved if rather than focusing on the individual channels convergence, the convergence of a combined measure is considered, such as specifically $$\overline{h}^{(k)}(q) = g_1^{(k)}(q) * \hat{h}_1^{(k)}(q) + g_2^{(k)}(q) * \hat{h}_2^{(k)}(q)$$

If the time-varying filters 103, 105 are constant or not implemented, i.e. $g_1^{(k)}(q) = g_2^{(k)}(q) = 1$, the input autocorrelation matrix could be approximated by $$R_x \approx \begin{bmatrix} I \\ I \end{bmatrix} R_S [I \ I]$$

where $I$ denotes the L×L identity matrix and $R_s$ denote the auto correlation matrix of the far-end signal $s(n)$.

Thus, the combined channel estimate corresponding to the previously mentioned RLS approach can be shown to correspond to (by expanding the previous equations):

$$\overline{h}^{(k)} \approx (1 - \mu) \cdot \overline{h}^{(k-1)} + \mu \cdot R_s^{-1} \left( \sum_n s(n) y(n) \right)$$

Thus in such a case, the echo cancellation convergence (the behavior of $\overline{h}^{(k)}$) is equivalent to (and specifically is as good as) a mono-channel AEC.

In the above equation, the first term represents the previous combined channel estimate and the second term represents the current channel estimate update. The relative weight $\mu$ determines how much the update is weighted relative to the existing estimate. The equation may be considered to correspond to an IIR filter and thus provides a low pass filtering of the channel estimates generated in the individual frame. The value of the relative weight $\mu$ determines the low pass filtering effect and thus controls both the speed of convergence and the noise performance.

For $0 \leq \mu \leq 1$, the global solution can be interpreted as a convex combination of the previous and the local solutions. In order to have fast convergence, the relative weight $\mu$ may be chosen to be close to one ($\mu \to 1$). However, in order to have better noise robustness, the relative weight $\mu$ may be chosen to be close to zero ($\mu \to 0$). Thus, the value of $\mu$ may be set to provide the desired trade off between noise performance and convergence speed.

The introduction of the time varying filters 103, 105 results in the loudspeakers signals $x_1(n)$ and $x_2(n)$ no longer being stationary. This is used to facilitate the channel estimation and in particular to allow a differentiation between the signals received at the microphone 111 from the two different paths.

In the system of FIG. 1, the update duration (the filter frame length) for the time varying filters 103, 105 is set to be an integer multiple of the echo cancellation frame duration. Thus, the time varying filters 103, 105 are kept constant for a given number K of echo cancellation frames and each of these filter frames may have a duration of $T_G = K T_H$. Such an approach allows facilitated operation and implementation.

In such a scenario, the autocorrelation matrix $R_x$ is typically estimated over a duration which is substantially longer than an echo cancellation frame. It can be shown (assuming K≤M and the signal stationarity in each filter frame) that the long-term autocorrelation matrix $R_x$ may be approximated by $$R_x \approx \gamma_k \left( \begin{bmatrix} G_1^{(k-K)} \\ G_2^{(k-K)} \end{bmatrix} R_S \begin{bmatrix} G_1^{(k-K)^T} & G_2^{(k-K)^T} \end{bmatrix} \right) + (1 - \gamma_k) \left( \begin{bmatrix} G_1^{(k)} \\ G_2^{(k)} \end{bmatrix} R_S \begin{bmatrix} G_1^{(k)^T} & G_2^{(k)^T} \end{bmatrix} \right)$$

where $$\gamma_k = \frac{K - (k \bmod K)}{K} \leq 1;$$

mod denotes the modulo operator and $R_S$ is the covariance matrix of the remote-end signal.

Substituting this into the previous equation and after some manipulations, it can be shown that:

$$\overline{h}^{(k)} \approx \left( 1 - \frac{\mu}{1 - \gamma_k} \right) \overline{h}^{(k-1)} + \frac{\mu}{1 - \gamma_k} \cdot R_s^{-1} \left( \sum_n s(n) y(n) \right)$$

Thus, as indicated by the above equation, the approach of setting a fixed weight for the update of the two individual channel estimates, i.e. to update the two channel estimates according to:

$$\hat{h}_i^k = \hat{h}_i^{k-1} + \mu \cdot \Delta \hat{h}_i^k$$

together with the use of non-stationary loudspeaker signals (e.g. due to the time varying filters 103, 105) results in an effective step size for the combined echo cancellation of the two audio sources which is given by $$\overline{\mu}_k = \frac{\mu}{1 - \gamma_k}$$

Thus, the result of this update approach is that the effective echo cancellation update weight is time variant. Indeed, in the specific example it will vary from $\mu$ to infinity for different values of k, i.e. for different frame numbers in the filter frame.

Indeed, the approach may lead to erratic and unstable performance. For example, if $(1-\gamma_k) < \mu$, an undesirable adaptation behavior results where the current channel estimate update is over-amplified $$\left( \frac{\mu}{1 - \gamma_k} \geq 1 \right)$$

and indeed the previous channel estimate is subtracted $$\left( 1 - \left( \frac{\mu}{1 - \gamma_k} \right) \right) \leq 0.$$

Also, if the update weight is restricted to the stability region (i.e., $K\mu \leq 1$), the individual channel estimates will have a poor convergence behavior as this requires a very low weight for these ($\mu \ll 1$).

In the system of FIG. 1, the channel estimator 117 is arranged to use a weight which is varied depending on a time parameter. In particular, the system comprises a weight processor 119 which continuously calculates the relative weight to be applied to the channel estimate update relative to the previous channel estimate. In the example, the weight processor 119 is coupled to the channel estimator 117 and provides this with the current weight to use. Furthermore, in the specific example, the weight processor 119 may also be arranged to control the updates of the time varying filters 103, 105 and may specifically provide the new coefficients to apply when a new filter update frame initiates.

Thus, in the system of FIG. 1, the weight processor 119 calculates a relative weight which is dependent on a time value. It will be appreciated that the weight may be dependent on other parameters than just the time value. However, in the system, the weight will vary with time even if all such parameters are constant.

The effect of making the relative weight for the update time variant is that an improved trade-off can be achieved between the update of the individual channels and the behavior of the echo-cancellation as a whole. In particular, the time varying characteristic of the effective step size for the combined echo cancellation $$\bar{\mu}_k = \frac{\mu}{1 - \gamma_k}$$

can be compensated or even eliminated to provide an improved echo cancellation.

For example, the weight processor 119 can be arranged to vary the step size for updating the individual weights within each filter frame in dependence on the time duration since a start of the filter frame. In the specific system wherein both the filter update and the echo cancellation is performed in frames, the relative weight may specifically be varied between consecutive echo-cancellation frames but kept constant within each echo cancellation frame. Thus, in such embodiments, the weight for the current echo cancellation frame may simply be determined as a function of the current frame number within the current filter frame (corresponding to the effective step size of the combined echo cancellation being dependent only on the frame number).

Thus, in such embodiments, the weight pattern may be repeated between consecutive filter frames resulting in a periodic and repeating pattern.

As a specific example, the weight for the channel estimate updates may be set to reflect the impact on the echo cancellation update and may specifically be set to result in this being substantially constant. In the specific example, the parameter $\gamma_k$ is known as it depends only on the known quantities of the current echo cancellation frame number in the filter frame and the total number of echo cancellation frames in each filter frame.

Specifically, the relative update weight for the channel estimate update for each channel may be set to:

$$\mu_k = \mu_0 \cdot (1 - \gamma_k) = \mu_0 \cdot \frac{k \bmod K}{K}$$

where $\mu_0$ is a nominal weight. The nominal weight may, e.g., be a predetermined fixed value, may be constant for e.g., each filter frame, or may, e.g., be dependent on other non-time parameters. The nominal weight $\mu_0$ essentially controls the convergence of the noise cancellation whereas the time varying weight $\mu_k$ reflects the weight that is applied when updating the weights and thus controls the convergence of the individual channel estimates.

Thus, in the example, the weight processor 119 generates a scaling factor for a nominal weight value and then determines the relative weight to be proportional to the product of these. The time varying relative weight $\mu_k$ is then used when updating the individual channel estimates according to:

$$\hat{h}_i^k = \hat{h}_i^{k-1} + \mu_k \cdot \Delta \hat{h}_i^k$$

resulting in an echo cancellation convergence of:

$$\bar{h}^{(k)} \approx (1 - \mu_0) \bar{h}^{(k-1)} + \mu_0 \cdot R_s^{-1} \left( \sum_n s(n) y(n) \right)$$

The nominal weight $\mu_0$ can then be selected ($0 \leq \mu_0 \leq 1$) to provide the desired trade-off between the convergence and the steady-state noise cancellation performance of the system.

In the specific system, the weight processor 119 is thus arranged to generate a relative weight for the channel estimate update which increases (or does not decrease) for increasing time since the last filter update. Indeed in the specific example, the relative weight $\mu_k$ is a stepwise function which increases from 0 for k=0 to $$\mu_0 \left( 1 - \frac{1}{K} \right)$$

for k=K−1. An example of such a function is shown in FIG. 2.

In the example, the weight for the channel estimate update is a monotonic non-decreasing function of the time since the last update of the time varying filters 103, 105. It should be noted that such a variation is contrary to general feedback system approaches and may seem counterintuitive. Indeed, in typical feedback systems, a substantial change in the characteristics of the system will require the feedback process to converge towards the new settings and therefore a large initial weighting of the update value to provide faster convergence may seem attractive. When the system has converged, the weighting of the update value may be reduced. However, as demonstrated by the above analysis, the system of FIG. 1 is actually arranged to operate in a direct opposite way, namely by having a low update weight initially and then increasing this with time.

It should also be noted that the approach of FIG. 1 not only provides improved echo cancellation but is also simple to implement and indeed may easily be introduced to existing echo cancellers.

In the above example, the time variation was intentionally introduced by the use of time varying filters. However, it will be appreciated that the described approach is not limited to such scenarios. Indeed, the described approach is applicable for any use wherein rendering of signals to be cancelled is time-varying. Indeed, such time variation may be intentional or may e.g. be an unintended or uncontrolled time variation such as for example may be the case when the microphone or one of the speakers is moved.

For example, in the system of FIG. 1, the filters 103, 105 may be constant or non-existent, i.e. $g_1(q) = g_2(q) = 1$. However, when one of the speakers 107, 109 or the microphone 111 is moved, this may be detected and the weight processor 119 may proceed to generate a time varying weight for the channel estimate update.

Specifically, the channel estimator 117 may be arranged to detect that one of the channels from a loudspeaker 107, 109 to the microphone 111 has changed by more than a certain amount in a certain time. Thus, the channel estimator 117 detects whether one or both of the channels have experienced a change that meets a suitable criterion.

The change may be detected directly e.g. by evaluating the magnitude of the channel estimate update for a channel and detecting whether this exceeds a given threshold. In other embodiments, a more indirect detection may be used, e.g. by detecting whether the resulting signal e(n) in periods of relative silence (e.g. corresponding to the microphone signal has a signal energy below a given threshold) exceeds a given level.

If the channel estimator 117 detects such a significant step change in the channel estimates, it proceeds to indicate this to the weight processor 119. The weight processor 119 then proceeds to initiate a time variation of the relative weight. For example, the weight processor 119 may proceed to modify the weight in a similar pattern as that of FIG. 2. Thus, the value may be determined as a function of the time duration since the change was detected. In particular, the weight processor 119 may set an initial value for the relative weight to a suitably low value (e.g. zero) immediately following the change and then proceed to increase this as a monotonic non-decreasing function of the duration since the change. It may proceed to do this until it reaches a maximum value which may be a predetermined value.

In the first described example with time varying filters 103, 105, the relative weight was a function of the current time relative to the duration of the filter interval. However, in the example where there are no time varying filters, the relative weight may be determined as a function of an echo canceling averaging interval.

For example, if the far-end speaker changes his position such that the far end channel changes from h(1)(q) to h(2)(q)), this is equivalent to the situation where the speaker position is kept fixed while changing the time-varying filter from 1 to h(2)(q)/h(1)(q). Thus, a far-end speaker change results in a scenario which is equivalent to the scenario when the time-varying filter is changed. However, the value of K is very large as it will in principle include the entire past. However, as the adaptive filter update has a (maximum) memory of M frames, K may be set to correspond to the filter memory length M. Thus, the time-varying weight may be updated in the same way as described for the change in the time varying filters but using the value K=M.

It will be appreciated that the above description for clarity has described embodiments of the invention with reference to different functional circuits, units and processors. However, it will be apparent that any suitable distribution of functionality between different functional circuits, units or processors may be used without detracting from the invention. For example, functionality illustrated to be performed by separate processors or controllers may be performed by the same processor or controllers. Hence, references to specific functional units or circuits are only to be seen as references to suitable means for providing the described functionality rather than indicative of a strict logical or physical structure or organization.

The invention can be implemented in any suitable form including hardware, software, firmware or any combination of these. The invention may optionally be implemented at least partly as computer software running on one or more data processors and/or digital signal processors. The elements and components of an embodiment of the invention may be physically, functionally and logically implemented in any suitable way. Indeed the functionality may be implemented in a single unit, in a plurality of units or as part of other functional units. As such, the invention may be implemented in a single unit or may be physically and functionally distributed between different units, circuits and processors.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term comprising does not exclude the presence of other elements or steps.

Furthermore, although individually listed, a plurality of means, elements, circuits or method steps may be implemented by e.g. a single circuit, unit or processor. Additionally, although individual features may be included in different claims, these may possibly be advantageously combined, and the inclusion in different claims does not imply that a combination of features is not feasible and/or advantageous. Also the inclusion of a feature in one category of claims does not imply a limitation to this category but rather indicates that the feature is equally applicable to other claim categories as appropriate. Furthermore, the order of features in the claims do not imply any specific order in which the features must be worked and in particular the order of individual steps in a method claim does not imply that the steps must be performed in this order. Rather, the steps may be performed in any suitable order. In addition, singular references do not exclude a plurality. Thus references to "a", "an", "first", "second" etc do not preclude a plurality. Reference signs in the claims are provided merely as a clarifying example shall not be construed as limiting the scope of the claims in any way.

The invention claimed is:

1. A multi-channel acoustic echo canceller arrangement comprising:
a circuit for receiving a microphone signal from a microphone, the microphone signal comprising contributions from at least two audio sources to be cancelled;
an echo canceling circuit coupled to the microphone, the echo canceling circuit being arranged to perform echo cancellation of the at least two audio sources based on channel estimates for channels from each of the at least two audio sources to the microphone;
an estimation circuit for generating each of the channel estimates as a combination of a previous channel estimate and a channel estimate update, the combination comprising applying a relative weight to the channel estimate update relative to the previous channel estimate; and
a weight circuit arranged to vary the relative weight in response to a time value, wherein the relative weight is determined as a function of time, and wherein the weight circuit is arranged to increase the relative weight of the channel estimate update for increasing time durations.

2. The multi-channel acoustic echo canceller arrangement as claimed in claim 1, wherein the multi-channel acoustic echo canceller arrangement further comprises a time varying filter for each of the at least two audio sources, each time varying filter being arranged to filter a signal for one of the at least two audio sources.

3. The multi-channel acoustic echo canceller arrangement as claimed in claim 2, wherein the time value is a time duration since a last update of at least one of the time varying filters.

4. The multi-channel acoustic echo canceller arrangement as claimed in claim 3, wherein the weight circuit is arranged to generate a scaling factor for a nominal weight value and to determine the relative weight in response to the scaling factor for the nominal weight value, the scaling factor being dependent on the time duration.

5. The multi-channel acoustic echo canceller arrangement as claimed in claim 2, wherein at least one time-varying filter is arranged to be updated at discrete times thereby providing filter frames in which the time varying filter is constant, and the weight circuit is arranged to vary the relative weight within a filter frame dependent on a current time duration since a start of the filter frame.

6. The multi-channel acoustic echo canceller arrangement as claimed in claim 5, wherein the echo-canceling circuit is arranged to perform frame based echo-canceling, and the weight circuit is arranged to vary the relative weight between consecutive echo-cancellation frames.

7. The multi-channel acoustic echo canceller arrangement as claimed in claim 6, wherein the weight circuit is arranged to determine the relative weight as a function of an echo-cancellation frame number within a filter frame.

8. The multi-channel acoustic echo canceller arrangement as claimed in claim 7, wherein the weight circuit is arranged to determine a weight value for the channel estimate update as substantially proportional to:

$$\frac{k \bmod K}{K}$$

where k is an cancellation frame number, K is a number of echo cancellation frames in a filter frame and mod represents a modulo function.

9. The multi-channel acoustic echo canceller arrangement as claimed in claim 7, wherein there is a substantially integer relationship between a duration of the filter frames and a duration of the echo-cancellation frames.

10. The multi-channel acoustic echo canceller arrangement as claimed in claim 1, wherein the multi-channel acoustic echo canceller arrangement further comprises:
   a change circuit for detecting that a change in at least a first channel of the channels from each of the audio sources to the microphone meets a criterion; and
   a circuit for determining the time value as a time duration from the change.

11. The mufti-channel acoustic echo canceller arrangement as claimed in claim 10, wherein the change circuit is arranged to set an initial value for the relative weight following the change, and the weight circuit is arranged to increase the relative weight for increasing time durations since the change.

12. The multi-channel acoustic echo canceller arrangement as claimed in claim 10, wherein the weight circuit is arranged to determine the relative weight as a function of an echo-canceling averaging interval.

13. The multi-channel acoustic echo canceller arrangement claimed in claim 1, wherein the relative weight is a function only of a nominal weight value and the time value.

14. A method of multi-channel acoustic echo cancellation using an echo canceling circuit coupled to a microphone, the method comprising:
   receiving a microphone signal from the microphone, the microphone signal comprising contributions from at least two audio sources to be cancelled;
   performing echo cancellation of the at least two audio sources based on channel estimates for channels from each of the at least two audio sources to the microphone;
   generating each of the channel estimates as a combination of a previous channel estimate and a channel estimate update, the combination comprising applying a relative weight to the channel estimate update relative to the previous channel estimate; and
   varying the relative weight in response to a time value, wherein the relative weight is determined as a function of time, and wherein the relative weight of the channel estimate update is increased for increasing time durations.

\* \* \* \* \*